March 24, 1959 H. G. ANASTASIA ET AL 2,879,351
PRESSURE RESPONSIVE DEVICE
Filed April 27, 1955

INVENTORS
HARRY G. ANASTASIA
WILLIAM T. CLERMONT
BY
*Herbert Smith*
ATTORNEY

2,879,351
PRESSURE RESPONSIVE DEVICE

Harry G. Anastasia, Paramus, and William T. Clermont, Hackensack, N.J., assignors to Bendix Aviation Corporation, Teterboro, N.J., a corporation of Delaware Application April 27, 1955, Serial No. 504,272

3 Claims. (Cl. 200—83)

This invention relates to pressure responsive devices and more particularly to a novel miniature differential pressure device having a high natural frequency. The device utilizes a unitary pressure chamber including a thin, flat, flexible diaphragm having homogeneity of material.

Heretofore, pressure responsive devices, of the type to which this invention pertains, have generally employed either a pressure sensitive diaphragm of the bellows type or a Bourdon tube.

The pressure sensitive diaphragm of the bellows type usually includes two diaphragm blanks each formed with annular corrugations, which blanks have their peripheral edges soldered together. The lead seal solder combined with the diaphragm blanks, which blanks are generally made of beryllium copper, provide combined materials which do not have homogeneity.

In the Bourdon tube type of pressure sensitive element, the tube usually has a great deal of mass and is of a long length with a cap soldered on one end thereof, with the other end connected to a coupling means for connection to the pressure source. The mass and long length of the Bourdon tube results in a low natural frequency of vibration. When the tube reverberates, which usually happens in aircraft, the pointer or electric light which is responsive to operation of the Bourdon tube will fluctuate. This latter condition is not desirable and occurs, fundamentally, because of the low natural frequency of vibration of the device.

The present invention has a high natural frequency of vibration because of the physical properties of the diaphragm unit, the span of the diaphragm portion of the unit, which is made to a dimension of one inch or less, the thickness of the diaphragm, the type of materials used, the temper of the diaphragm, and other factors.

The diaphragm unit is made of a solid piece of material and is machined to the proper dimensions and includes the thin, flexible diaphragm portion, the thickness of the diaphragm being determined by the particular application of the device.

The present invention shows the pressure responsive device used in conjunction with a miniature differential pressure electrical switch, but it is to be understood that the device may have other uses, such as operating a computer and the like. The device may be used in conjunction with fuel pressures, hydraulic pressures, and gas pressures.

Because the device uses a diaphragm unit including a flexible diaphragm portion machined from a solid piece of material and eliminates all soldering of the diaphragm, the device provides a safety factor not present in conventional pressure sensitive devices of this general type used heretofore. Further, there is a reduction in cost. The device has simplicity in design. It permits miniaturization. Moreover, a wider choice of materials is possible. For example, the diaphragm unit may be cut from a block or blank of beryllium copper, copper, high carbon steel, Monel, Ni-Span C, Inconel, Phosphor bronze, or other materials, depending on the particular application of the device.

Another object is to provide a novel pressure responsive device which employs a diaphragm unit having the diaphragm portion made from the same piece of material as adjacent portions of the pressure chamber.

Another object is to provide a novel diaphragm unit for a pressure responsive device which permits miniaturization.

A further object of the invention is to provide a novel pressure responsive device having a high natural frequency and superior vibration characteristics.

A further object of the invention is to provide a novel pressure sensitive element which permits a wider selection of materials, homogeneity of pressure chamber material, simplicity in design and which can be manufactured at a reduced cost.

The present invention contemplates a pressure responsive device having a diaphragm unit including a chamber with a diaphragm portion thereof machined from a solid block of material. A diaphragm center post is also formed from the same block of material on one side of the diaphragm, and the chamber on the opposite side of the diaphragm has a threaded means for coupling the chamber to a pressure source. After the diaphragm unit is properly machined for its particular application, the unit is heat treated to obtain the maximum spring properties. Contact or signal switching means are mounted relative to the diaphragm center post and are actuable by movement of the diaphragm. Adjustment screws are used for setting the switching means. The entire unit has a sealed casing.

Figure 1:
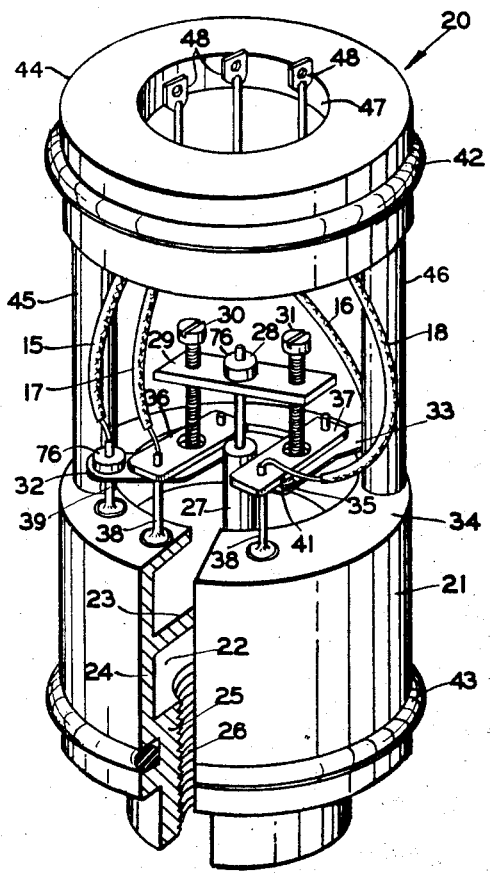
Fig. 1 is an enlarged perspective view, partially broken away, showing one form of the invention.

Referring to the drawings and more particularly to Fig. 1, there is shown a novel miniature differential pressure electrical switch 20 which has a diaphragm unit 21, machined from a solid block or blank of homogeneous material, such as beryllium copper. The diaphragm unit has a pressure chamber 22 with a diaphragm portion 23, an annular side wall 24, and a base portion 25 having a threaded bore 26 formed therein which bore communicates between the chamber 22 and the external pressure source, for example, a fuel pump. A diaphragm center post 27 is formed in the central portion of the diaphragm. The diaphragm center post 27 is normal to the upper surface of the diaphragm 23 and has an insulator post 28 soldered at one end thereof to the free end of the diaphragm center post 27. An adjustment screw bar 29 is secured to the base of the insulator post and said bar is normal to the axis of the diaphragm center post 27.

Adjustment screws, such as 30 and 31, are threadedly connected with the adjustment screw bar 29 and extend downwardly to engage lower contact springs 32 and 33, respectively. Contact springs 32 and 33 are secured to the annular flange 34, which flange is disposed at a right angle to the upper portion of the annular side wall 24. The particular portion of the side wall having the flange extends outwardly from the diaphragm 23 on the side thereof opposite the pressure chamber 22.

The contact springs 32 and 33 have lower contacts 35. Upper contact bars 36 and 37 are independently secured to the annular flange 34 on opposite sides thereof by means of insulator posts 38, which posts are similar to insulator post 28. The lower contact springs 32 and 33 are also secured to the annular flange 34 by insulator post 39, similar to posts 28, with the spring being secured at only one end thereof; while the opposite end thereof has the lower contact thereon. The upper contact bars 36 and 37 each have upper contacts 41 thereon. The upper contacts are positioned to engage their respective lower contacts when the diaphragm of the device operates a sufficient amount. There are two annular gasket cover seals 42 and 43 for the upper and lower portions of the device, respectively. The annular head 44 is secured by spacer posts 45 and 46 to the annular flange 34 with said spacer posts being on opposite sides of the flange. A wall 47 formed as part of the head 44 permits the lugs, such as 48, to be secured thereon by means of insulators in the wall. The lugs 48 are used as terminals for the conductors, such as 15 and 16 which are connected to the lower contact springs 32 and 33; while conductors 17 and 18 are connected to the upper contact bars 36 and 37, respectively. Conductors 15 and 16 are connected in common to one terminal as will be explained in conjunction with the wiring diagram.

Figure 2:
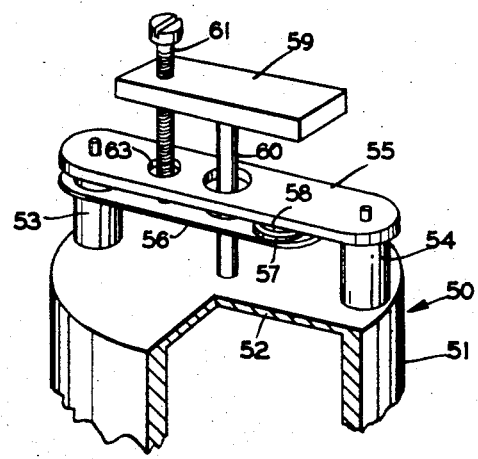
Fig. 2 is a partial perspective view of a modification of the invention.

Referring to Fig. 2, a modified diaphragm unit 50 has an annular side wall 51 formed integral with the diaphragm portion 52. Spacer posts 53 and 54 are secured to and positioned normally with the diaphragm portion to support contact or switching means. The upper contact bar 55 and lower contact spring 56 are secured to opposite ends of spacer posts 53 and 54, and insulated therefrom. The movable or lower contact spring 56 has one end thereof secured to the insulated post 53, while the opposite end thereof is free and has a contact 57 thereon. A contact 58 is secured to the upper contact bar 55 and is positioned opposite the contact 57 to permit engagement therewith. An adjustment screw bar 59 is secured to the upper end of the diaphragm center post 60, while the diaphragm center post, at the lower end thereof, is formed integral with the diaphragm portion 52 at the center thereof.

The adjustment screw 61 is threadedly connected in the screw bar 59 which passes freely through an opening 63 formed in the upper contact bar 55, so that the adjustment screw 61 may have the lower end thereof in engagement with the upper surface of the movable or lower contact spring 56. The contact bar is wholly stationary relative to the diaphragm unit; while the lower contact spring has one end that is fixed and is stationary relative to the diaphragm unit, while the opposite end of the lower contact spring is free to follow the adjustment screw until the contact set, consisting of the contact bar and the lower contact spring, engage each other.

Referring to Fig. 2, as pressure increases within the chamber which is partially formed by the lower surface of the diaphragm portion 52, the diaphragm will flex and urge the diaphragm center post 60 upward, thereby moving the adjustment screw bar and its adjustment screws 59 and 61, respectively, also in an upward direction. As the diaphragm moves upward, the adjustment screw will also move upward and permit the lower movable contact spring 56, which contact spring is biased in an upward direction normally engaging the adjustment screw, to follow the adjustment screw 61 until the contacts 57 and 58, which form a contact set, are in engagement, thereby closing an electrical circuit. Conversely, as the diaphragm pressure is decreased within the chamber of the diaphragm unit 50, the diaphragm center post 60 will move downward accordingly, thereby causing the ultimate downward movement of the contact spring 56, under influence of the adjustment screw, so that as the pressure is decreased sufficiently, the contacts 57 and 58 will become disengaged and the electrical circuit will open.

The operation of the device generally shown in Fig. 1 is substantially similar to that shown in Fig. 2. Concerning Fig. 1, when the pressure through the communicating port provided by the threaded bore 26, is communicated to the pressure chamber 22, the diaphragm center post 27 will be moved upward, thereby causing the adjustment screw bar 29 and its adjustment screws 30 and 31 to also move upward. The adjustment screws 30 and 31 pass freely through holes formed in the upper contact bars 36 and 37. Actually, the upper contact bars 36 and 37 are rigid members or bars of silver. The adjustment screw passage or holes in the upper contact bars 36 and 37 are similar to the hole 63 formed in the upper contact bar 55 of Fig. 2. The lower contact springs 32 and 33 of Fig. 1 are biased upwardly so that each engages its respective adjustment screw 30 and 31, respectively. The adjustment screws 30 and 31 may have different settings, so that one contact set will engage before the other contact set engages. Therefore, the make and break operation of the two contact sets may be different from each other, depending on the setting of the adjustment screws which may be set to operate at maximum or minimum limits of some range or operating scale, depending on the use of the device.

In both Figs. 1 and 2 the upper contact bars are rigid, while the lower contact springs are flexible. In both figures the lower contact spring will follow the contact setting or adjustment screw until the respective contact sets become engaged, and the electrical circuit will make and break accordingly.

Figure 3:
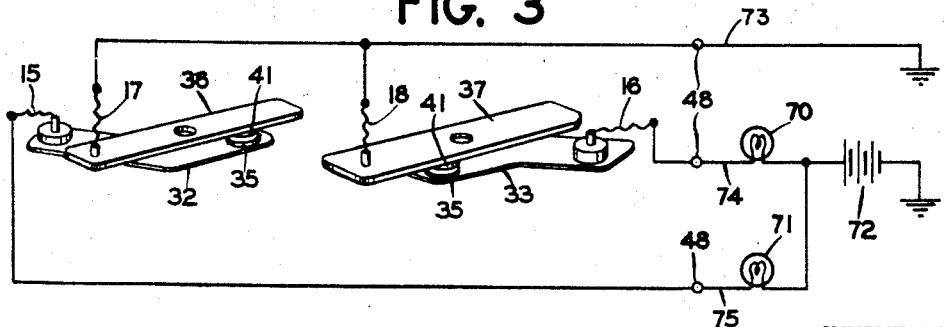
Fig. 3 is one form of wiring diagram usable in conjunction with the device shown in Fig. 1.

Referring to Fig. 3, the lower contact springs 32 and 33 are shown with their respective lower contacts, such as 35, while the upper contact bars 36 and 37 have electrical contacts, such as 41. Contact springs 36 and 37 are electrically connected together at a common terminal and then connected via a terminal such as 48 to ground, shown by conventional symbol. Contact bars 32 and 33 are shown connected to electric lights or bulbs 70 and 71, respectively, which in turn are connected to one side of a source of energy, shown as a battery 72, with the opposite side of the battery being connected to ground.

In operation of the complete device shown in Fig. 1, as the pressure is increased in the chamber 22, the diaphragm 23 will be urged upward in a direction to cause either one or the other of the contact sets to close first, with the remaining contact set closing later, assuming the diaphragm moves sufficiently far in the proper direction. Conversely, when the pressure in the chamber 22 is decreased sufficiently the contact sets of Fig. 1 will open in the reverse order than that referred to heretofore. Conductors, such as 73, 74 and 75, in the electrical circuit are connected as shown in Fig. 3 to the terminals, such as 48.

Figure 4:
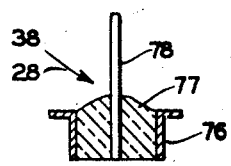
Fig. 4 is a sectional view of an insulator supporting post.

A cross sectional view of one form of insulator post, such as 28 or 38, which may be used, is shown in Fig. 4 wherein a base 76 is filled with an insulating material, such as glass 77, which has secured therein a stud 78 or pin. The insulating posts shown in the device presented in Figs. 1 and 2 may have insulated posts as shown in Fig. 4.

In Fig. 1, the insulating post supporting lower contact spring 32 is inverted and has its base 76 soldered to the contact spring 32, while the lower end of the stud is soldered to the annular flange 34, thereby providing a rigid support for one end of the contact spring. Concerning the insulator posts 38, which support the upper contact bars, such as 36 and 37, the upper contact bars are soldered to the studs, while the base of the respective studs are inserted in holes in the flange and are soldered thereto holding the insulator posts rigid.

The contact bars 36 and 37 (Fig. 1) and 55 (Fig. 2) have been described as having contacts, such as 58 (Fig. 2). Actually, in the miniature differential pressure switch, the silver contact bar is used alone, and does not have a contact such as 58, and the silver contact bar acts as the contact per se.

While an embodiment of the invention has been illustrated and described in detail, it is to be expressly understood that the invention is not limited thereto. Various changes may also be made in the design and arrangement

What is claimed is:

1. A pressure-responsive device comprised of a cylindrical hollow body having a thin flat top wall of uniform thickness across one end thereof, said body and said top wall being machined from a unitary block of homogeneous metal, said top wall having a small diameter and such thickness as to be flexed by pressure changes, bottom wall means opposite said top wall and connected to the other end of said body to form a cylindrical pressure chamber, said bottom wall means having central inlet passage for admitting pressurized fluid to said chamber, a center post connected to the center of the outer face of said thin flat top wall and extending perpendicularly therefrom, said center post being relatively short and of such diameter that it is easily moved by flexing of said top wall, adjustable electrical switch means above said top wall and below the level of the top of said center post, and means operatively connected to the top of said post and to said switch means for actuating said switch means in response to changes of pressure in said chamber as sensed by said top wall.

2. A pressure-responsive device comprised of a cylindrical hollow body having a thin flat top wall of uniform thickness across one end thereof, a center post extending perpendicularly from the center of the outer face of said thin flat top wall, said body having said top wall and said center post being machined from a unitary block of homogeneous metal, said top wall having a small diameter and such thickness as to be flexed by pressure changes, said center post being relatively short and of such diameter that it is easily moved by flexing of said top wall, bottom wall means opposite said top wall and connected to the other end of said body to form a pressure chamber, said bottom wall means having a central inlet passage for admitting pressurized fluid to said chamber, adjustable electrical switch means above said top wall and below the level of the top of said center post, means operatively connected to the top of said post and to said switch means for actuating said switch means in response to changes of pressure in said chamber as sensed by said top wall, and said switch means including a flexible contact element supported by said body and extending parallel to said top wall.

3. A pressure-responsive device comprised of a cylindrical hollow body having a thin flat top wall of uniform thickness across one end thereof, a center post extending perpendicularly from the center of the outer face of said thin flat top wall, said body having said top wall and said center post being machined from a unitary block of homogeneous metal, said top wall having a small diameter and such thickness as to be flexed by pressure changes, said center post being relatively short and of such diameter that it is easily moved by flexing of said top wall, bottom wall means opposite said top wall and connected to the other end of said body to form a pressure chamber, said bottom wall means having a central inlet passage for admitting pressurized fluid to said chamber, electrical switch means above said top wall and below the level of the top of said center post, means including a flat bar operatively connected to the top of said post and to said switch means for actuating said switch means in response to changes of pressure in said chamber as sensed by said top wall, said switch means including a flexible contact element supported by said body and extending parallel to said top wall, said flat bar being mounted on said center post and extending over and parallel to said top wall, and said means including an adjusting screw threaded through an end of said bar and connected to said movable contact element for the actuation thereof.

References Cited in the file of this patent

UNITED STATES PATENTS

| | | |
|---|---|---|
| 1,614,376 | MacGlashan | Jan. 11, 1927 |
| 1,940,300 | Gerdien et al. | Dec. 19, 1933 |
| 2,112,211 | Parks | Mar. 22, 1938 |
| 2,116,960 | Brown et al. | May 10, 1938 |
| 2,315,758 | Willits | Apr. 6, 1943 |
| 2,343,060 | Horning | Feb. 29, 1944 |
| 2,476,927 | Stojanek | July 19, 1949 |
| 2,574,791 | Kroll | Nov. 13, 1951 |
| 2,648,016 | Van Gastle | Aug. 4, 1953 |
| 2,656,431 | Bochan | Oct. 20, 1953 |
| 2,755,362 | Jacobs | July 17, 1956 |

FOREIGN PATENTS

| | | |
|---|---|---|
| 63,222 | Switzerland | Feb. 27, 1913 |
| 399,234 | Great Britain | Oct. 5, 1953 |
| 756,981 | Germany | Nov. 19, 1953 |